(12) United States Patent
Chiang (10) Patent No.: US 8,842,071 B2
(45) Date of Patent: *Sep. 23, 2014

(54) PORTABLE PHONE WITH EYE MOTION DETECTION

(76) Inventor: Kuo-Ching Chiang, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,983

(22) Filed: Jul. 9, 2012

(65) Prior Publication Data

US 2012/0274593 A1    Nov. 1, 2012

Related U.S. Application Data

(63) Continuation of application No. 11/889,602, filed on Aug. 15, 2007, which is a continuation-in-part of application No. 11/790,238, filed on Apr. 24, 2007.

(51) Int. Cl.
*G06F 3/033* (2013.01)

(52) U.S. Cl.
USPC ........... 345/163; 345/156; 345/157; 345/590; 715/863

(58) Field of Classification Search
USPC .......... 715/863; 345/463, 173, 156, 157, 694, 345/590
See application file for complete search history.

(56) References Cited

U.S. PATENT DOCUMENTS

| | | | |
|---|---|---|---|
| 6,791,531 B1* | 9/2004 | Johnston et al. | 345/157 |
| 7,522,344 B1* | 4/2009 | Curatu et al. | 359/634 |
| 2003/0069516 A1* | 4/2003 | Becker et al. | 600/554 |
| 2006/0033701 A1* | 2/2006 | Wilson | 345/156 |
| 2006/0161871 A1* | 7/2006 | Hotelling et al. | 715/863 |
| 2007/0228969 A1* | 10/2007 | Kim et al. | 313/582 |
| 2008/0170982 A1* | 7/2008 | Zhang et al. | 423/447.3 |

* cited by examiner

*Primary Examiner* — Sharad Rampuria
*Assistant Examiner* — Shahriar Behnamian
(74) *Attorney, Agent, or Firm* — Chih Feng Yeh; Huntington IP Consulting Co., Ltd.

(57) ABSTRACT

The portable communicating device with transparent display includes a control unit; a communication module is coupled to the control unit, and a memory is coupled to the control unit. At least one image sensor is coupled to the control unit; a transparent display without an opaque shell is coupled to the control unit and wherein the transparent display includes two transparent substrates, each of the two transparent substrates includes a transparent electrodes, light emitting substances provided between the two transparent substrates; wherein the transparent display allow a user to see through the transparent display at least when the transparent display is not displayed.

13 Claims, 9 Drawing Sheets

PORTABLE PHONE WITH EYE MOTION DETECTION

CROSS-REFERENCE TO RELATED APPLICATION

This application is a continuation application of Ser. No. 11/889,602, filed on Aug. 15, 2007, now pending, which is a continuation in part application of U.S. patent application Ser. No. 11/790,238, filed on Apr. 24, 2007, now abandoned. The content of the above-mentioned patent applications is hereby incorporated by reference herein in its entirety and made a part of this specification.

TECHNICAL FIELD

The present invention generally relates to a portable device, and more particularly to an electronic device with user motion control module.

BACKGROUND OF THE RELATED ART

Cellular communications systems typically include multiple base stations for communicating with mobile stations in various geographical transmission areas. Each base station provides an interface between the mobile station and a telecommunications network. Mobile telephone systems are in use or being developed in which the geographic coverage area of the system is divided into smaller separate cells, it communicates with the network via a fixed station located in the cell. Mobile telephones belonging to the system are free to travel from one cell to another. When a subscriber within the same system or within an external system wishes to call a mobile subscriber within this system, the network must have information on the actual location of the mobile telephone.

Recently, the price of cellular telephone has been greatly reduced and become affordable to lots of people. It is common that a person owns more than one cellular phone. Some people even replace their cellular telephones as often as they replace their clothes or hairstyle. The cellular manufactures have to release new models with different appearances, function and styles more frequently so as to attract the attention of the buyer and occupy a favorable marketing share. Furthermore, the conventional LCD display has a lot of drawbacks, for example, the LCD display needs back light module which increases the thickness of the panel and it is not transparent. Liquid crystal material and color filter are also essential components to the display. Moreover, the device requires large arrays of thin film transistors, the manufacture is complicated and the resolution is not high enough. Further, the antenna of the conventional device is embedded within the device, and shield by a lot of IC or components. The signal reception is interrupted by a lot of device and EM shielding effect. The mouse is inconvenient to a user, especially, to a portable device. There is a desired to remove the mouse device. As recognized herein, for portability, it is desirable to configure the projector to be as slim as possible. But the goal of size reduction is frustrated by the present of the elements mentioned above. Pluralities of devices, such as mobile phone, PDA, GPS, smart phone, are developed recently. These devices allow the user communicates with other wirelessly, each of which utilizes some sort of user interface. The display of the devices having user interface typically maybe LCD or other type display. The display is typically configured to present visual information such as text and graphics. In most cases, the user interface is positioned on the front face of the electronic device for easy viewing and easy manipulation.

However, the trend of the portable device is small, light weight and multi-function. Typically, the size of the display is limited by the device size. It is very inconvenience to browse the web page by the small panel. The user should move the scroll of the interface through touch pen functional keys or on the key pad. Namely, the user uses the touch pen or keys moving the web page forwardly and backwardly. The conventional design is a user-not-friendly design.

SUMMARY

The object of the present invention is to provide a device with hybrid memory and advanced display with thinner transparent panel on which a transparent antenna may be formed to minimize the shielding effect. The portable communicating device with transparent display includes a control unit; a communication module is coupled to the control unit, and a memory is coupled to the control unit. An antenna is coupled to the communication module. At least one image sensor is coupled to the control unit; a transparent display with an opaque shell is coupled to the control unit and wherein the transparent display includes two transparent substrates, each of the two transparent substrates includes a transparent electrodes, light emitting substances provided between the two transparent substrates; wherein the transparent display allow a user to see through the transparent display at least when the transparent display is not displayed. The further object of the present invention is to provide a computing device with eye control module. A method of controlling a virtual object by eye motion of a user for an electronic computing device having a display includes providing at least one image sensor for the display of the electronic computing device to capture image of the user in front of the display, wherein the at least one image sensor includes CMOS or CCD sensor, wherein the at least one image sensor provided to detect eye motion of the user to output a first control signal to a virtual object without touching the display, the user being located in front of the at least one image sensor and keeping the display with a distance; capturing images of the eye motion of the user without touching the display by the at least one image sensor; analyzing image change of the eye motion; generating a first control signal in responsive to the image change of the eye motion detection; providing a vocal control through a microphone and a vocal control software of the electronic computing device to output a second control signal through voice recognition; and controlling the virtual object displayed on the display in responsive to the first, second or combination control signal without touching the display of the computing device. The method further provides an infrared ray (IR) source for detecting the user. The control signal includes cursor movement, character input, application instruction, webpage movement or image size change. The dual light sources are used to project two spatially separated spots at user's pupil, and the dual light sources are constructed by side by side on a panel the portable device.

A method of controlling a virtual object by eye motion and figure motion of a user for an electronic computing device having a display includes providing at least one image sensor for the display of the electronic computing device to capture image of the user in front of the display, wherein the at least one image sensor includes CMOS or CCD sensor, wherein the at least one image sensor provided to detect eye motion of the user to output a first control signal to a virtual object without touching the display, the user being located in front of the at least one image sensor and keeping the display with a distance; capturing images of the eye motion of the user without touching the display by the at least one image sensor;

analyzing image change of the eye motion; generating a first control signal in responsive to the image change of the eye motion detection; capturing images of the figure motion of the user without touching the display by the at least one image sensor; analyzing image change of the figure motion;

generating a second control signal in responsive to the image change of the figure motion detection; and controlling the virtual object displayed on the display in responsive to the first, second or combination control signal without touching the display of the computing device.

A method of controlling a virtual object by eye motion and finger motion of a user for an electronic computing device having a display includes:

providing at least one image sensor for the display of the electronic computing device to capture image of the user in front of the display, wherein the at least one image sensor includes CMOS or CCD sensor, wherein the at least one image sensor provided to detect eye motion of the user to output a first control signal to a virtual object without touching the display, the user being located in front of the at least one image sensor and keeping the display with a distance; capturing images of the eye motion of the user without touching the display by the at least one image sensor; analyzing image change of the eye motion; generating a first control signal in responsive to the image change of the eye motion detection; capturing images of the finger motion of the user without touching the display by the at least one image sensor; analyzing image change of the finger motion;

generating a second control signal in responsive to the image change of the finger motion detection; and controlling the virtual object displayed on the display in responsive to the first, second or combination control signal without touching the display of the computing device.

A method of controlling a virtual object motion by user motion for an electronic device comprises: detecting a user motion by detecting device; generating a control signal in responsive to the user motion detection; and controlling the virtual object displayed on a display in responsive to the control signal. The user motion is detected by CMOS sensor, CCD, touch sensor array. The user motion includes facial motion, eye motion, or finger motion. The method further comprises a step of analysis the user motion before generating the control signal. The analysis includes the analysis of image change of the user motion. Alternatively, the present invention discloses a method of instructing a virtual object by user activity for an electronic device comprising: detecting a user activity by a detecting device; generating a control signal in responsive to the user activity detection; controlling the virtual object displayed on a display in responsive to the control signal to execute the instruction.

The present invention discloses a computing device comprising: a control unit and a display; a detecting source for generating a detecting light to eye of a user; a sensor in responsive to the detecting light back from the eye to generate an output signal, thereby generating eye movement information; a cursor control module in responsive to the eye movement information to drive a cursor on the display corresponding to the eye movement information. The computing device further comprises a touch screen module coupled to the control unit to generate at least one button-image on the display along with the cursor. Alternatively, the computing device further comprises an input interface to allow the user to active "click on" action. The computing device includes but not limited to notebook, PC, cellular, PDA and the like.

A method for browsing web page, text, email or image on a display of an electronic device, comprises displaying a first part of the web page, text, email or image on the display; providing sensing array on the display; determining whether or not a user touching the sensing array; determining user motion based on the user's touch; generating a control signal based on the user motion; displaying a second part of the web page, text, email or image on the display based on the control signal, wherein the control signal indicates where the user would like to browser. The user motion includes at least one finger motion. The first part does not overlap with the second part. Alternatively, the first part partially overlaps with the second part.

BRIEF DESCRIPTION OF THE DRAWINGS

FIG. 15-FIG. 15-2 show a flow chart according to the present invention.

DETAILED DESCRIPTION

The present invention relates generally to a computing or portable device. The device includes but not limited to cellular phone, PDA (personal digital assistant), smart phone, notebook, digital still camera, digital video camera, medium player (MP3, MP4), GPS and the equivalent thereof.

Figure 1:
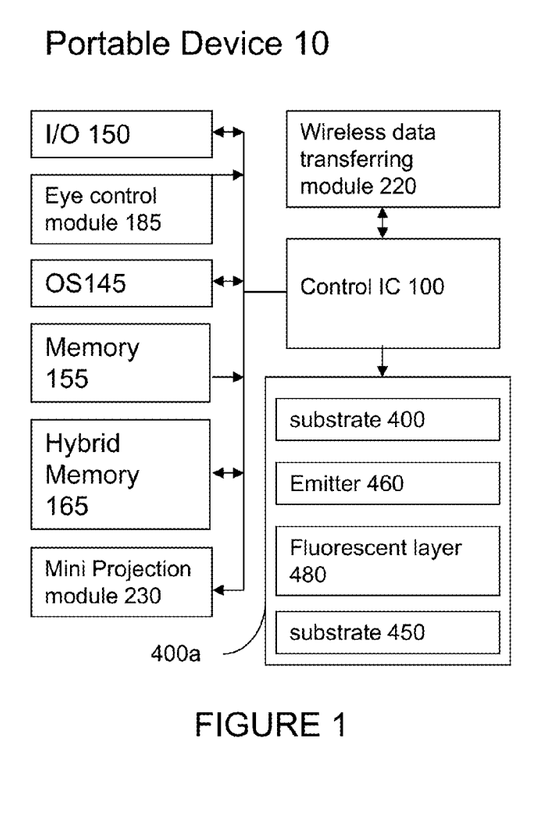
FIG. 1-2 shows a diagram of a portable device according to the present invention.
Figure 2:
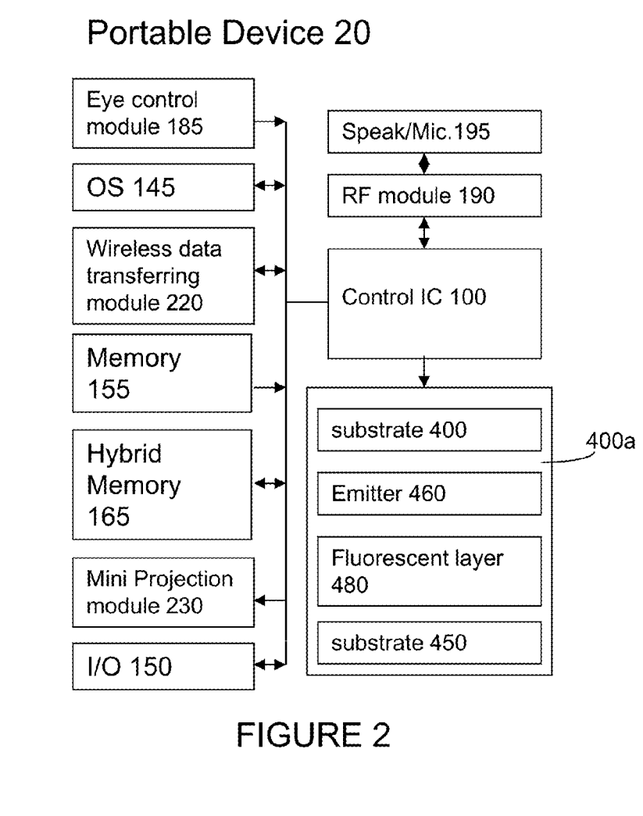

FIG. 1 is a diagram illustrating main components of a portable communication device using a panel with emitters and transparent substrate according to an embodiment of the present invention. The embodiment, as shown in FIG. 1 and FIG. 2, the device 20 includes a RF module 190. As know in the art, the RF module 190 includes antenna. This antenna is connected to a transceiver, which is used to receive and transmit signal. AS known, the RF module 190 further includes CODEC, DSP and A/D converter as well. Due to the RF module is not the feature of the present invention, therefore, the detailed description is omitted. Other major components between device 10 and 20 are similar, therefore, the same reference numbers refers to similar component, however, the version, grade and performance maybe different. The present invention includes a central control IC 100, an input and output (I/O) unit 150, OS 145, hybrid memory 165, the device 10 or 20 may includes other memory 155 such as ROM, RAM and FLASH memory. The RF module may perform the function of signal transmitting and receiving, frequency synthesizing, base-band processing and digital signal processing. If the portable device is cellular, SIM card hardware interface is provided for receiving a SIM card. Finally, the signal is send to the final actuators, i.e. a loudspeaker and a microphone 195 or I/O 150.

The present invention further includes a wireless transmission/receiving module 220 coupled to the control IC 100. The transmission/receiving module is compatible with bluetooth, home-RF, 802.11x, WiFi, WiMAX standard or their higher version. The transmission domain (the air) by nature is not secured and therefore encryption maybe essential in the wireless transport networks. In one embodiment, pair-wise encryption/decryption between every neighboring wireless network device of a wireless transport network is well-known in the art. A data frame that leaves from one wireless device from one end of a wireless transport network to the other end of the same network might need several encryptions and decryptions before it reaches its final destination. A mini projection module 230 maybe incorporated into the portable device, the mini projection module 230 may refer to the co-pending application, Ser. No. 11/734,175, filed by the same inventor of the application.

Figure 3:
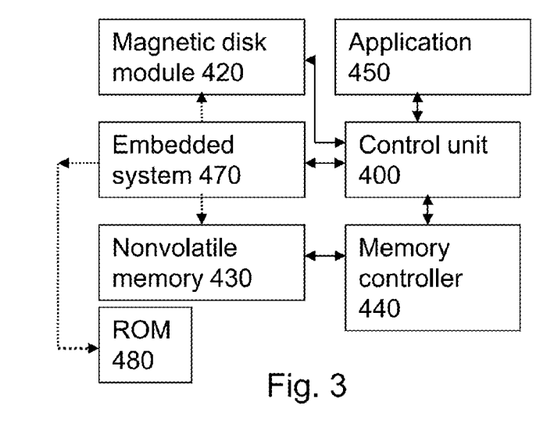
FIG. 3-4 shows a diagram of a portable device according to the present invention.
Figure 4:
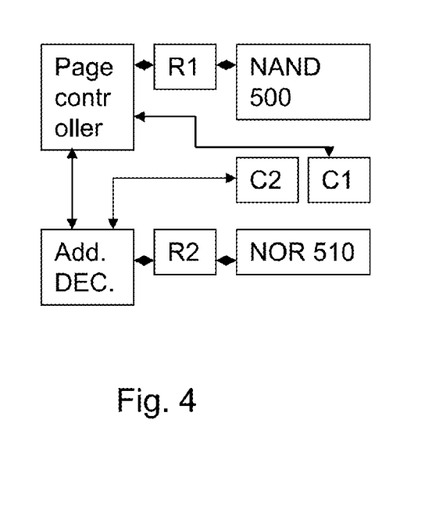

Optionally, the present invention also provides a hard disk drive incorporated with a Flash memory within one single unit, as shown in FIG. 3 to have the benefits of both. The hard disk drive includes a control unit 400 coupled to a magnetic disk module having spindle driver, reading/writing head mechanism and so on. This is well-known in the art, the description is omitted. A flash controller 440 is coupled to the control unit 400 and a nonvolatile memory 430 is coupled to the flash controller 440. An application 450 is coupled to the control unit to execute the instruction. The hybrid hard disc drive incorporates the flash memory into the device to yield the benefit of high-speed access and low power consumption. The hard disk drive maybe incorporated into portable media player, cellular, notebook or PDA. A controller 440 is connected to the flash memory 430 to operate the mode under instruction or command. The operation mode includes read mode, write mode, erase mode, and programming mode. Further, the controller 440 maybe integrated into the control unit 400 under the knowledge and technology of integrated circuits. An embedded system 470 is optionally stored in the erasable/programmable storage medium (flash, ROM or hard disk). It could be an application, software or a list of computer-executable instructions. Alternatively, the ROM 480 may be embedded in the control unit. The data coded in the ROM will not be erased by the user. The embedded system 470 could be provided for a computer or device to execute predetermined function such as operating some application, booting the device, auto backup or auto-run file. In general, after a device is power on, basic input/output system will perform a boot sequence before invoking the OS. Basic input/output system is set in the ROM. The programmer or instruction can be set in the embedded system to determine what type of data will be stored into what type of storage (flash or hard disk). It could be used for different type of volatile memory having NOR device and NAND device (FIG. 4). A hybrid memory scheme may refer to the above co-pending application filed by the identical inventor of the application, entitled "Monitoring System with a Wireless Transmitting/Receiving Module". The co-pending application is incorporated herein for reference. Under such configuration, the computing device, for example, personal computer, notebook, may omit the hard disc drive. The scheme uses NOR device to act and replace the role of hard disc to store operation system and yield the benefit of high speed operation and low power consumption, while the data is stored in the NAND device. The operation speed will be higher than the one employing hard disc. In one embodiment, the embedded system is coupled to the control unit to determine or assign the duty of the magnetic disk module 420 and the nonvolatile memory 430. The flash benefits high speed performance, low power consumption while hard disk drive yields lower cost and high capacity. The storage architecture refers to Complementary Storage Device (CSD). The CSD has the benefits of the both type of memory. The manufacture may reduce the cost and increase the performance by incorporating the two kind of memory with an optimized memory ratio between the flash memory and the magnetic memory.

Figure 5:
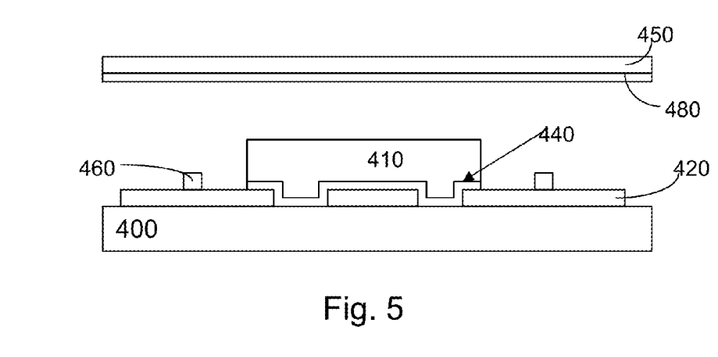
FIG. 5 shows a diagram of field emitter device according to the present invention.

Almost all conventional devices include an antenna located within the portable device, the signal receiving performance is poor due to EM shielding effect generated by the shield, circuits, circuit board and other components. If the antenna to the signal is "transparency", the performance will be improved. Therefore, in another aspect of the present invention is to provide an antenna located corresponding to a substantially transparent panel which removes the opaque shell to minimize the EM shielding effect, thereby improving signal receiving/transmitting performance. Preferably, at least one transparent antenna is attached on the substantially transparent panel (display) to minimize the EM shielding effect. On the other hand, the consumer is unlikely to choose the product from various production if the product lacks of the product differentiation such that the product cannot be distinguish from the various similar product. Thus, if the product may offer distinguishable features, then it may increase the transaction opportunity. In order to improvement the point, the present invention provide the device with transparent substrate to allow the user or consumer may see through the display at least when the display is not displayed. The portable communicating device includes a transparent substrate without opaque shell to allow the user may see-through the display. Therefore, the present invention provide see-through display visual effect. As seen in FIGS. 1 and 2, a substrate 400 is provided and transparent electrodes 420 are formed on the glass substrate 400. The substrate 400 could be silicon, glass, quartz or the like. The transparent panel or display without the opaque shell embodiment of the present invention is shown in FIG. 5, it is a cross-sectional view of the transparent panel or display without the opaque shell includes field emission devices according to the present invention. As seen in FIG. 5, the transparent panel or display without the opaque shell includes a transparent substrate 400 is provided and transparent electrodes 420 are formed on the glass substrate 400. The transparent electrodes 420 may be made of indium tin oxide (ITO) and may be used as the emitter electrodes. Stacked gate 410 that cover a portion of the transparent electrodes 420 are formed on the glass substrate 400. Emitters 460 that emit electrons are formed on a portion of the transparent electrode 420. Each stacked gate 410 includes a mask layer 440 that covers a portion of the transparent electrodes, and is formed by UV photolithograph mask. The mask layer 440 is preferably transparent to visible light, but opaque to ultra violet rays and can be made of an amorphous silicon layer. The silicon layer will be transparent when the thickness is thin enough. A stacked gate 410 structure includes first insulating layer/ a gate electrode/a second insulating layer/focus gate electrode, sequentially formed over the substrate. The gate insulating layer is preferably a silicon oxide thin film and the gate electrode is made of chrome. The gate electrode is used for extracting an electron beam from the emitter. The focus gate electrode performs as a collector for collecting electrons emitted from emitter so that the electrons can reach a fluorescent film 480 disposed above the emitter 460. If the device is used for display, the substrate can be silicon or transparent substrate. Referring to FIG. 5, a front panel (substrate) 450 is disposed upward and above the stacked gate. A variety of visual images are displayed on the front panel 450. A fluorescent film 480 is attached to a bottom surface of the front panel 450 that faces the stacked gate and a direct current voltage is applied to the fluorescent film 480 to emit color for display. The fluorescent substance may emit color light by mixing the emitted light if the thin film with R, G, B fluorescent substances. Preferably, the fluorescent substances emit red, green, and blue visible light when excited by the electron beam is evenly distributed on the fluorescent film 480. Spacer separating the front panel 450 from the stacked gate is a black matrix layer and is not shown for convenience. Due to the thin film display is formed with thinner thick and the power consumption is lower than LCD, the present invention may provide smaller size, lighter weight device. The life time of battery may last longer. The field emission device does not require complicated, power-consuming back lights and filters which are necessary for LCD. Moreover, the device does not require large arrays of thin film transistors, and thus, a major source of high cost and yield problems for active matrix LCDs is eliminated. The resolution of the display can be improved by using a focus grid to collimate electrons. Preferably, the emitter includes a carbon nanotube emitter to further reducing the device size and improve the resolution. Further, the transparent display may omit the liquid crystal material and opaque shell to reduce the thickness of the communication device and offer special visual effect. Further, the field emission display does not require the S/D regions which are required by TFT for LCD.

Figure 6:
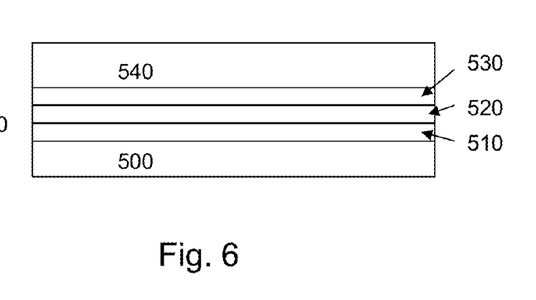
FIG. 6 shows diagram of a EL according to the present invention.

In another embodiment, the transparent display without the opaque shell is shown in FIG. 6. The transparent display includes a transparent electrode 510 on a transparent substrate 500. A light-emitting film or powder 520 is attached to an upper surface of the lower transparent electrode 510. Preferably, the light-emitting film emits color light. The present invention includes three such components that separately display image in red components, green components, and blue component. Each irradiates single color light. Different light-emitting material will emit different color. An upper transparent electrode 530 is formed on the light-emitting film or powder 520. A second transparent substrate 540 is formed on the transparent electrode 540. Both of the substrate are transparent and both two electrodes are transparent to allow the user may see-through the display without the opaque shell to block the light to let the light penetrates the whole display structure. A bias is applied on the electrodes to inject hole and electron, thereby exciting the light-emitting substances by the combination of the electron and hole to emit red, green, or blue visible light depending on the compound of the light-emitting substances. Therefore, the present invention may reduce the thickness of the portable communication device, reduce the EM shielding effect and provide special display see-through visual effect.

Figure 7:
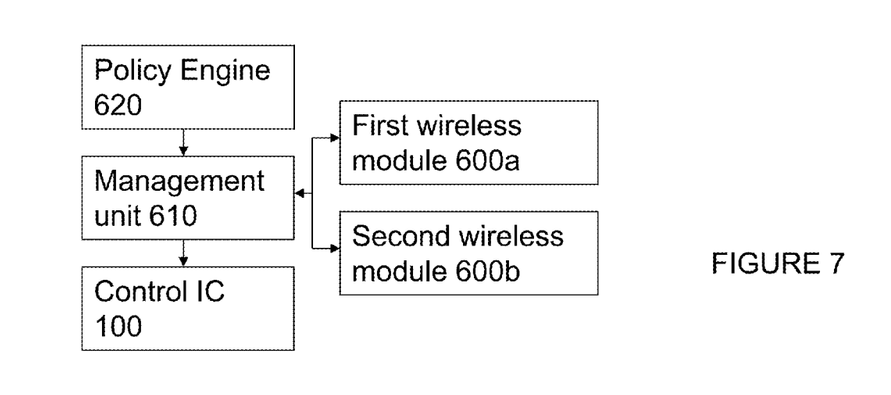
FIG. 7 shows a diagram of dual wireless module according to the present invention.

In another embodiment, the wireless data transferring module 220 includes dual mode module. Please refer to FIG. 7, in one case, the wireless data transferring module 220 includes a first and second wireless module 600a and 600b for wireless transmission. The dual modules 600a and 600b are coupled to a management unit 600 to manage the dual modules according to the policy set in a policy engine 610. For example, the policy in the policy engine 610 includes at least the transmission priority policy to determine which module will be the default module to receive/transmit data. It also includes the switching condition for switching there between. For example, the signal strength is one of the facts for switch condition. It also allows the user to set or alter the condition via user interface. The first and second wireless module maybe one of the following module: blue-tooth, 802.11x, WiFi, WiMAX, 3G standard or their higher (update) version. Preferably, the first wireless module is WiFi and the second wireless module is WiMax. The present invention may yield the benefits of both. For example, the access range of WiFi is shorter than WiMax, but it consumes lower power. If within the office area, the AP for WiFi may be employed to prevent others outside the office from accessing the server of the office. In another aspect, if the user would like to access or remote control a terminal device located at several miles away, the WiMax is chosen. The WiFi benefits security, low power consumption while WiMax yields long range and high bandwidth. The module architecture refers to dual wireless module (DWM). The DWM has the benefits of the both type of module. The first wireless module is compatible to a first communication protocol, while the second one is compatible to a second communication protocol. The manufacture may increase the performance by incorporating the two kind of wireless module memory with an optimized configuration. The protocol maybe adapted to wireless local area network or wireless mediate area network.

From above, the thick opaque shell and complicated LCD panel is removed, thereby reducing the thickness of the portable device and a lot of elements such as color filter, LC material, back light module are also skipped from the present invention. Furthermore, due to the substrate 400, 450 could be formed by glass, quartz or the like, therefore, the present invention may offer unexpected and funny transparent visual effect. Under the sleep mode or off state of the device, the panel is substantial transparent, while the device is not operation or standby, or at the sleep mode, the transparent panel may acts as digital photo album due to the panel is transparent. Further, the user may alter the color, image pattern displayed on the panel when the device is in the sleep mode or off-state. The user may determine the pattern and image for the panel cover. Furthermore, a transparent antenna may be attached on the transparent panel to provide better signal transmission due to EM shield effect of the antenna will be minimized while the antenna is not set within the device. In this case, the antenna is composed by a material includes oxide containing metal or alloy, wherein the metal is preferable to select one or more metals from Au, Zn, Ag, Pd, Pt, Rh, Ru, Cu, Fe, Ni, Co, Sn, Ti, In, Al, Ta, Ga, Ge and Sb. Some of the transparent material includes oxide containing Zn with $Al_2O_3$ doped therein.

Figure 8:
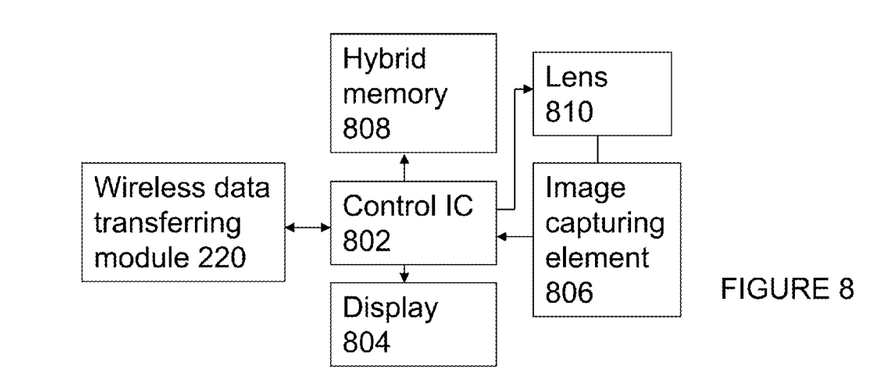
FIG. 8 shows a diagram of digital camera according to the present invention.

Further, referring to FIG. 8, the wireless transferring module 220 and hybrid memory maybe employed by a digital camera or digital video camera. Preferably, the device includes a main body having a control IC 802; a display 804 formed on the main body and coupled to the control IC 802; an image capture element 806 formed within the main body and coupled to the control IC 802; the hybrid memory 808 is coupled to the processor; a lens mechanism 810 is formed on the main body, coupled to the control IC 802 and corresponding to the image capture element 806; the wireless transferring module is coupled to the processor for data transferring with external device.

If the present invention is employed for medium player such as MP3 player, MP4 player, the player includes an analog/digital (A/D) converter for converting analog audio signals into digital audio signals. The analog audio signals can come from an audio source coupled to player. A digital signal processor (DSP) or an audio and/or video driving module, for instance MP3, MP4 codec, are coupled to A/D converter to receive the digital audio signals. In one embodiment, MP3 or MP4 codec executes a firmware that includes a MPEG audio layer (e.g., MP3, MP2, or both) codec or video codec (e.g., MP4), and DSP executes a firmware that includes a different type of audio codec (e.g., WMA, ACC, or both). In one embodiment, the firmware for DSP also includes a video codec for encoding and decoding videos (e.g., MPEG-4 V1/V2/V3, DivX 3.11/4.0/5.0, Xvid, AVI/ASF, or any combination thereof). MP3 (or MP4) codec and DSP are coupled to a nonvolatile memory that stores the compressed audio data. The user can select an audio file from nonvolatile memory. DSP are coupled to an audio processor, which processes the digital audio signals according to default settings or user instructions. Audio processor is coupled to a digital/analog (D/A) converter, which converts the digital audio signals into analog audio signals for the user.

Figure 10:
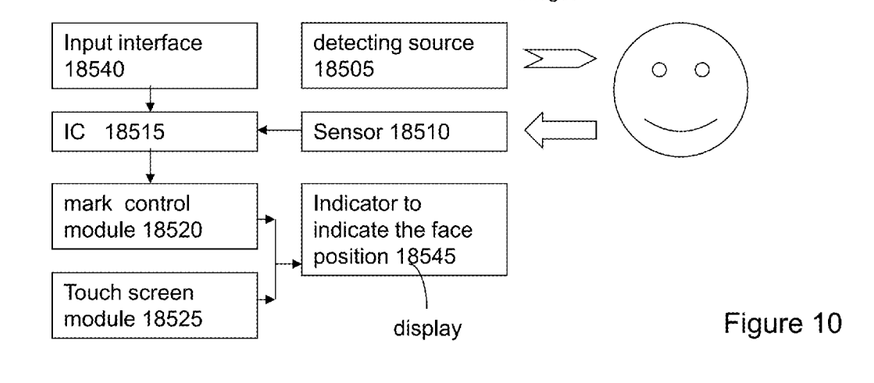
Figure 11:
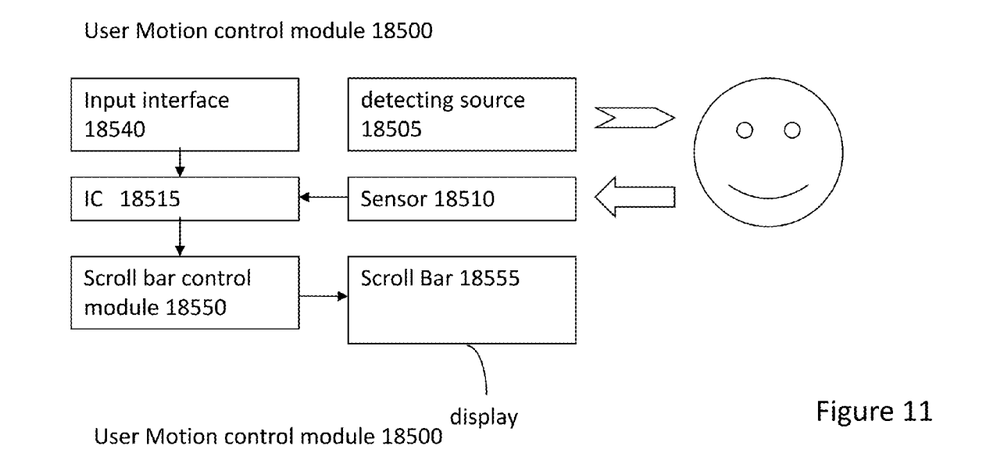

The present invention also provides a user control module to control the cursor without mouse or touchpad. A computing device comprises a display and a detecting device on said display for detecting motion of a user. A movement information generating device is in responsive to the detection to generate an output signal, thereby generating movement information. A cursor control module is in responsive to the movement information to drive a cursor on the display corresponding to the movement information. Referring now to the drawings 1-2 and 9, there is shown in schematic form the basic components of the control module 185 incorporating the eye, finger or face control module according to a preferred embodiment of the invention. The present invention includes a step of detecting the finger motion of a user. For example, in FIGS. 9 and 10, the user is located in front of the sensor in order to detect the motion of finger. Preferably, the portion for detection could be eye, finger, face or the like. The eye detection will be introduced as one of the examples to illustrate the features of present invention. The subject's face, finger, or eye is positioned relative to a sensor so that initially the subject's gaze is aligned along center line toward a pupil stimulus and fixation target. The eye control module 185 includes sensor and IC to detect eye motion and generate a control signal. The face motion could be used to practice the present invention. A detecting source 18505 is provided, the pupil of the eye(s) is (are) illuminated by the light source 18505, for example, an infrared ray (IR) or light emitting diode (LED). The IR may be used for distance measurement. Preferably, dual source LED is used to project two spatially separated spots at the subject's pupil. The dual source LED is constructed by placing two LED side by side on the panel 400a of the portable device. Back light from the subject's eye is detected by a sensor 18510 directly or via other optical mirror or lens. Another method is to detect the user face motion or image by the sensor. The sensor 18510 could be optical sensor such as CMOS sensor or CCD. The outputs from the sensor 18510 are input to a processor or control integrated circuits 18515 to generate a control signal to a cursor control module 18520 for controlling a cursor on the display or panel. Eye detection method may refer to U.S. Pat. Nos. 7,130,447 and 5,943,754, both are assigned to The Boeing Company (Chicago, Ill.); U.S. Pat. No. 5,670,613, assigned to Pulse Medical Instruments, Inc. (Rockville, Md.). U.S. Pat. No. 5,422,690 discloses eye recognition and blink detection system. Preferably, the detecting source or the like scans the position of the pupil of eye(s). In this process the pupil is illuminated by a light source, so that the geometric form of the pupil can be portrayed clearly on the sensor. Alternatively, the image (face, finger) change of the user could be detected by the present invention. By means of image processing, the pupil position information is evaluated and to determine where the eye in the display is looking The control signal may drive the cursor to the position where the eyes are looking through cursor control module 18520. A buttons-image (or button-icons) may be generated along with the cursor by an image generator 18525. In one case, the image generator 18525 maybe a touch screen module which may generate touch screen image via well-known touch screen technology, in the manner, the user may "click on" the virtual bottom to input a command by means of "clicking" the touch screen. Alternatively, the click signal maybe input from input interface 18540 such as (the right and left buttons of) the keypad, vocal control through microphone, eye motion through the sensor 18510. In the case of vocal control, another software/hardware maybe necessary to process the steps of object selection through voice recognition hardware and/or software. For example, the action of close left eye refers to click left button while the action of close right eye refers to click right button. If both eyes close, it may refer to select one item from a list. The above default function may be practiced by a program and software. It should be understood by persons skilled in the art, the foregoing preferred embodiment of the present invention is illustrative of the present invention rather than limiting the present invention. Modification will now suggest itself to those skilled in the art. Under the method disclosed by the present invention, the user may move the cursor automatically without the mouse. Similarly, the control signal may be used to drive the scroll bar moving upwardly or downwardly without clicking the bar while reading document displayed on the screen, as shown in FIG. 11. Thus, the control signal generated by IC will be fed into the scroll bar control module 18550 to drive the scroll bar 18555 on the display moving upwardly or downwardly without the mouse or keypad. An eye controllable screen pointer is provided. The eye tracking signals are performed in a calculation by a processing means residing in a processor or integrated circuits to produce a cursor on the screen.

Figure 9:
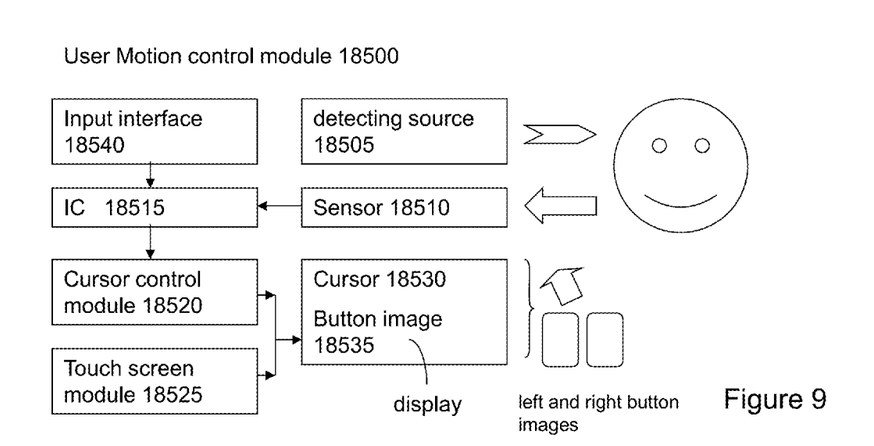
FIGS. 9, 10, 11 and 12 show a diagram of eye control module according to the present invention.

The sensor is electrically coupled to the controller (IC) 18515 via line. In a preferred embodiment, input controller 18515 comprises a semiconductor integrated circuit or chip configured to receive, interpret and process electrical signals, and to provide output electrical signals. Output signals from IC 18515 comprise signals indicative of movement of eye in a direction corresponding to the direction of actual cursor movement on the display intended by the user. The present embodiment takes into account a possible "dragging" situation that the user may be faced with. On occasion, some users have a need to "drag" an icon or other object from one area of the screen to another. On some computers, to accomplish this, the user must hold down the left click button and control the pointing device at the same time. If a touchpad is being used as the pointing device, and the object must a dragged a long distance across the screen, sometimes the user's finger may reach the edge of the touchpad. This situation is easily handled by the present invention. In such a situation, the controller may send the command (e.g. "click left mouse button", while dragging) repeatedly until the user's finger leaves a keyboard key (stops pressing a key). This permits dragging to be performed even after the user's finger leaves the touchpad. U.S. Pat. No. 7,165,225, assigned to Microsoft Corporation (Redmond, Wash.) disclosed "Methods and systems for cursor tracking in a multilevel GUI hierarchy". U.S. Pat. No. 7,095,447, assigned to Samsung Electronics Co., Ltd. (Kyonggi-do, KR) disclosed "OSD (on screen display) cursor display method and cursor image display apparatus". U.S. Pat. No. 7,137,068, assigned to Microsoft Corporation (Redmond, Wash.) disclosed "Apparatus and method for automatically positioning a cursor on a control". U.S. Pat. No. 6,774,886, assigned to Matsushita Electric Industrial Co., Ltd. (Osaka, JP) disclosed "Display system, cursor position indication method, and recording medium".

Therefore, the present invention providing a method of pointing a mark such as cursor, bar on a screen, the method includes detecting motion of a user (such as eye, face motion) and a sensor is in responsive to the detection of the eye to generate an output signal, thereby generating eye movement information; A cursor control module is in responsive to the user movement information to drive a cursor on the display corresponding to the movement information.

Similarly, the above method maybe used for face tracing in the field of digital still camera or digital video camera to tracking the face of the subject. By the almost same scheme, a face indication (or mark) module 18545 is responsive to the control signal to mark the face on the screen, thereby tracking the face for the digital camera. A digital camera comprises a control unit and a display; a detecting source for detecting eye of a user who is under photographed; a sensor in responsive to the detecting light back from the eye to generate an output signal, thereby generating eye movement information; a cursor control module in responsive to the eye movement information to drive a face indicator on the display corresponding to the eye movement information. The digital camera further comprises a wireless data transferring module coupled to the control unit for data transferring with an external device.

As aforementioned, the present invention discloses a user motion control module for computer, display or portable device. The module could be incorporated into the device adjacent to the keypad, display or keyboard area. Then, it may detect the finger or figure motion of the user to move the cursor or virtual objects. Under some embodiments, the CMOS or CCD is used to detect the user motion including the facial expression, facial motion, figure motion or finger motion. In these applications, the sensor may capture the images of the user's finger or figure motion and the controller may analysis the image change, thereby determining the cursor movement. The monitoring of and response to the user's facial expressions may also be used, for example, the user's motion could be monitored with a still camera or a video camera. As aforementioned in [0031], a detecting source 18505 is provided and the user is illuminated by the light source 18505, for example, an infrared ray (IR) may be used for distance measurement. For example, in FIGS. 9 and 10, in order to detect the motion of user's finger or figure, the user is located in front of the sensor and the display. It is unlike the conventional track ball, control panel for notebook. The sensitivity, resolution and controllability of the control panel are not so good. It should be noted, in the embodiment, the user motion detecting module is set adjacent to the keypad of notebook, display or keyboard of the PC. The user motion detecting module detects the finger or figure motion of the user by CMOS, CCD as aforementioned method. The resolution of the CMOS sensor may achieve higher than several Mega pixels. It may precisely reflect the finger or figure (or face) motion of the user.

Figure 12:
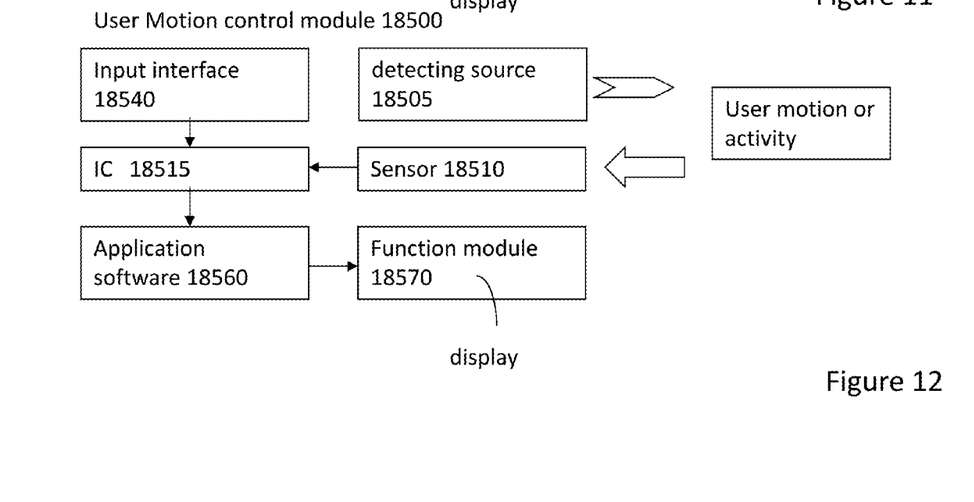

Alternatively, the cursor or items or function of computer (such as open file, close file, copy, cut, paste, etc.,) may be controlled by the user activity, such as through the measurement of the activity of the human brain. The EEG (electroencephalograph) records the voltage fluctuations of the brain which can be detected using electrodes attached to the scalp. The EEG signals arise from the cerebral cortex, a layer of highly convoluted neuronal tissue several centimeters thick. Alpha waves (8-13 Hz) that can be effected if the user concentrates on simple mentally isolated actions like closing one's eyes; Beta waves (14-30 Hz) associated with an alert state of mind; Theta waves (4-7 Hz) usually associated with the beginning of sleep state by frustration or disappointment; and Delta waves (below 3.5 Hz) associated with deep sleep. Electromyographic (EMG) sensors are attached to the person's skin to sense and translate muscular impulses. Also Electrooculargraphic (EOG) signals have been sensed from eye movement. U.S. Pat. No. 7,153,279, assigned to George Washington University disclosed a brain retraction sensor. U.S. Pat. No. 7,171,262, assigned to Nihon Kohden Corporation disclosed a Vital sign display monitor. FIG. 12 is a diagram of an illustrative embodiment of the invention. The neural activity is tracked on neural activity detecting device 350. Preferably, the neural activity tracked includes EEG, EOG, EMG activity. The electrical signals representative of the neural activity are transmitted via wired or wireless to the control unit. If a predetermined signal is sensed by detecting device 350, the same EEG readings may be monitored. For example, the Alpha waves (8-13 Hz) can be effected if the user concentrates on some actions. Thus, if the concentration pattern is detected, the system system is responsive to the signal and issue an instruction to take action to "open file", "close file", "copy file", "clicking", "paste", "delete", "space", or "inputting characteristics" etc. It should be noted that the state patterns of potential users may be monitored before the system is used.

The control IC 18515 is coupled to a signal receiver (not shown) which receives the neural signals from sensor 18510 by antenna or wired. An operating system runs on CPU, provides control and is used to coordinate the function of the various components of system and Application programs 18560. These programs include the programs for converting the received neural electrical signals into computer actions on the screen of display. By using the aforementioned devices, a user is capable of controlling the computer action by inputting neural information to the system through sensor. There will be described the setting up of a program according to the present invention for a user controlling a computer with sensed neural signals. A program is set up in the computer to use the electrical signals to control computer functions and/or functions controlled by the computer. A process is provided for predetermining the neural activity level (or pattern) that indicates the level of concentration of the user. A sensor is provided for monitoring a user's neural activity to determine when the predetermined neural activity level has been reached. The user's EEG pattern is determined. The user's neural activity is converted to electrical signals, and to give an instruction to execute a software functions. Before the user EGG pattern is determined, an image sensor (CCD or CMOS) is introduced to monitor the facial motion (or eye motion) to determine where the user looks at on the screen.

Therefore, the present invention discloses a method of controlling a cursor by user motion for a computing device comprising without touch the display: detecting a user motion by detecting device; generating a control signal in responsive to the user motion detection; and controlling the cursor displayed on a display in responsive to the control signal. The user motion is detected by CMOS or CCD and the user motion includes facial motion, eye motion, or finger motion. The method further comprises a step of analysis the user finger motion before generating the control signal. The analysis includes the analysis of image change of the user finger (or figure) motion. The frame rate of the CMOS may achieve 30 FPS (frame per second). Thus, during 0.5 second, at least 15 frames are taken; the present invention has enough data to analysis the finger image and may analysis the finger image change easier. During the time interval, only the fingers are moving, and the background is stand still relative to the fingers. After analysis several frames of the finger images, it may determine that the finger motion direction is from, for example, down-left to up-right, thereby controlling the virtual object. The sensor is provided to detect a user in front of the display and the sensor.

A method of instructing a virtual object by user activity, for instance, figure or figure motion for a computing device comprises detecting a user activity by a detecting device; generating a control signal in responsive to the user activity detection; controlling the virtual object displayed on a display in responsive to the control signal to execute the instruction. The user activity is detected by CMOS or CCD and the user activity includes facial motion, eye motion, figure or finger motion. The analysis includes the analysis of figure or finger image change of the user. Alternatively, the user activity is detected by EEG, EMG, or EOG sensor. The control signal includes cursor movement, character input, software application instruction. The virtual object includes cursor, control bar, icon, displayed image, web page. In the case of figure detection, the user may keep a distance to the CMOS or CCD for remote control. The user is located in front of the image sensor and keeps the display with a distance measure by the detecting light source 18505 for remote control and the user's hand is not necessary over a keyboard and the virtual object is control by the user figure motion without touching the display.

A method of instructing an object by user activity for a computing device comprises detecting a user motion by a detecting device by CMOS or CCD; generating a control signal in responsive to the user motion detection; controlling the object displayed on a display in responsive to the control signal; detecting a EEG, EMG, EOG pattern by a EEG, EMG, EOG sensor to execute an instruction.

Figures 13, 14:
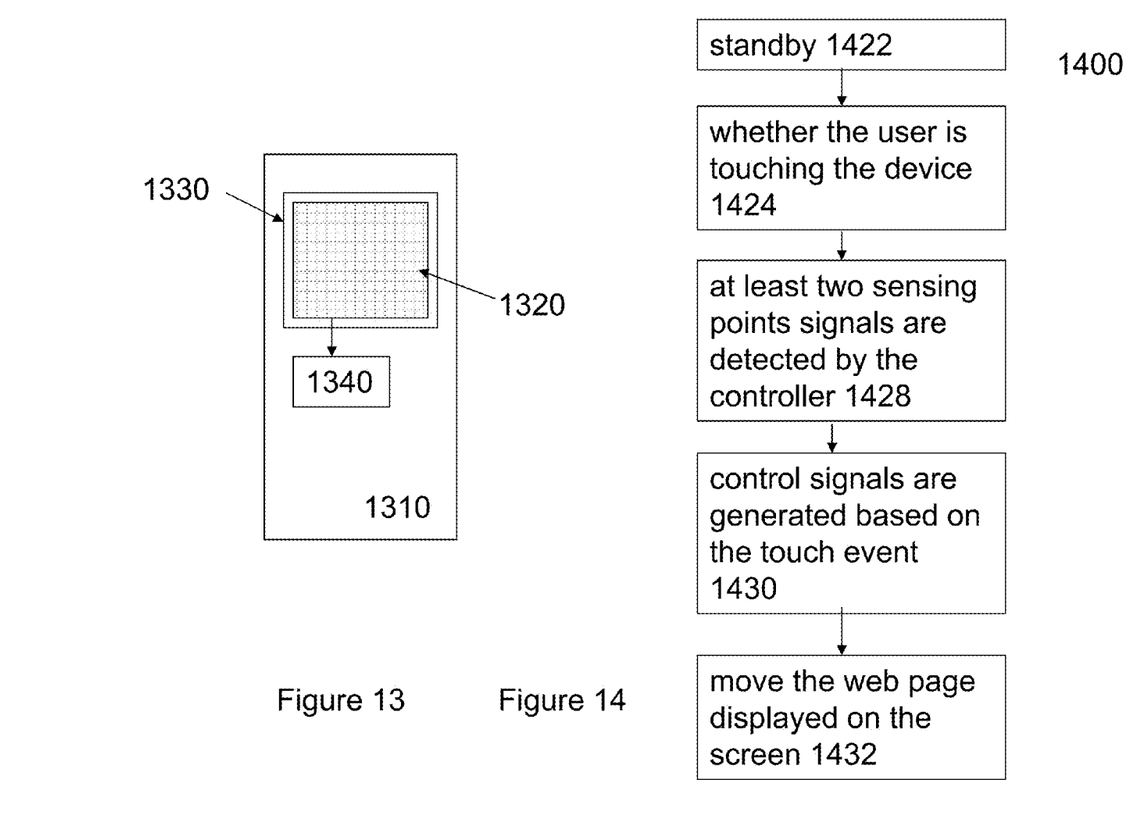
FIG. 13 shows a diagram of according to the present invention.
FIG. 14 shows a flow chart according to the present invention.

FIG. 13 is a simplified diagram of a portable electronic device 1310, in accordance with one embodiment of the present invention. The portable electronic device 1310 may for example be a hand held electronic device such as cellular phones, PDAs, media players, and GPS, or notebook, Tablet PCs and game players. The portable electronic device 1310 is configured with a sensor array on the display. The sensor array 1320 is configured to detect the presence of an object such as a finger as well as the location and pressure being exerted on the surface of the panel by the finger or palm of the hand. By way of example, the sensor array 1320 may be based on capacitive sensing, resistive sensing, surface acoustic wave sensing, thermal sensing and/or the like. The sensor array 1320 may further be based on pressure sensing such as strain gauges, force sensitive resisters, load cells, pressure plates, piezoelectric transducers or the like.

As shown in FIG. 13, the portable electronic device 1310 includes a housing and a display 1330 situated in a front surface of the housing. The portable electronic device 1310 also includes a touch sensing device 1320 is situated on the display. FIG. 13 is a perspective diagram of a hand held electronic device 1310, in accordance with one embodiment of the present invention. The hand held electronic device 1310 includes a housing that encloses internally various electrical components including integrated circuit chips. By way of example, the housing may contain a microprocessor (e.g., CPU), memory (ROM, RAM), a power supply (e.g., battery), a printed circuit board (PCB), a hard drive or other memory (e.g., flash) and/or various input/output (I/O) support circuitry. The hand held electronic device 1310 also includes a transparent display 1330 disposed within and viewable through an opening in the housing. The transparent display 1330 is typically placed on the front surface of the device 1310. The display 1330 provides visual information in the form of text, characters or graphics. By way of example, the display 1330 may correspond to a liquid crystal display (LCD), organic light emitting diodes (OLED), or a display that is based on electronic inks, electronic paper.

In order to generate user inputs, the hand held electronic device 1310 may include a sensing array 1320 that is a transparent input panel positioned in front of the display 1330. The sensing array 1320 generates input signals when an object such as a finger is moved across the surface of the sensing array 1320, for example linearly, radially, rotary, etc., from an object holding a particular position on the array 1320 and/or by a finger tapping on the array 1320. In most cases, the sensing array allows a user to initiate movements in a GUI by simply touching the display screen via a finger. For example, the sensing array 1320 recognizes the touch and position of the touch on the display 1330 and an interpreting controller 1340 of the hand held electronic device 1310 interprets the touch and thereafter performs an action based on the touch event. In accordance with one embodiment, the sensing array 1320 is a multi-touch sensing device that has the ability to sense multiple points of contact at the same time and report the multiple touches to the controller of the handheld electronic device. In one implementation, the sensing array 1320 is a multipoint capacitive touch screen that is divided into several independent and spatially distinct sensing points, nodes or regions that are positioned throughout the display. The sensing points, which are typically transparent, are dispersed about the sensing array with each sensing point representing a different position on the surface of the display. The sensing points may be positioned in a grid or a pixel array where each pixilated sensing point is capable of generating a signal. The signal is produced each time an object is positioned over a sensing point. When an object is placed over multiple sensing points or when the object is moved between or over multiple sensing point, multiple signals can be generated. The sensing points generally map the touch screen plane into a coordinate system such as a Cartesian coordinate system or a Polar coordinate system. An example of a multipoint capacitive touch screen may be found in U.S. patent Ser. No. 10/840,862, which is herein incorporated by reference.

The hand held electronic device 1310 may be designed to recognize gestures applied to the sensing array 1320 and to control aspects of the hand held electronic device 1310 based on the gestures. The gestures may be made through various particularly finger motions. The hand held electronic device 1310 may include a gesture operational program, which may be part of the operating system or a separate application. The gestural operation program generally includes a set of instructions that recognizes the occurrence of gestures and informs one or more software agents of the gestures and/or what action(s) to take in response to the gestures. By way of example, gestures that can be used are disclosed in greater detail in U.S. patent Ser. No. 10/903,964, which is herein incorporated by reference.

In one embodiment, the sensing input device is mapped to the display. When mapped, points on the sensing input device coincide with points on the display, i.e., have the same coordinates (x and y). Therefore, when a user touches the sensing input device surface, it will appear as if the user is touching the image at the same location of the display. As shown, the sensing array 1320 is divided into several independent and spatially distinct sensing points (or regions) that are positioned within the respective component. The sensing points are generally dispersed about the respective component with each sensing point representing a different position on the surface of the component and thus the device 10. The sensing points may be positioned in a grid or a pixel array where each pixilated sensing point is capable of generating a signal. The number and configuration of the sensing points may be widely varied. The number and configuration of sensing points generally depends on the desired resolution of the touch sensitive surface and may be varied from spot to spot across the display to achieve any desired compromise between cost and functionality. In the case, a signal is produced each time the finger is positioned over a sensing point. When an object is placed over multiple sensing points or when the object is moved between or over multiple sensing points, multiple position signals are generated. As should be appreciated, the number, combination and frequency of signals in a given time frame may indicate size, location, direction, speed, acceleration and the pressure of the finger or palm on the surface of the device. By way of example, the control system may be a microcontroller located within the housing of the device 1310.

Figure 15:
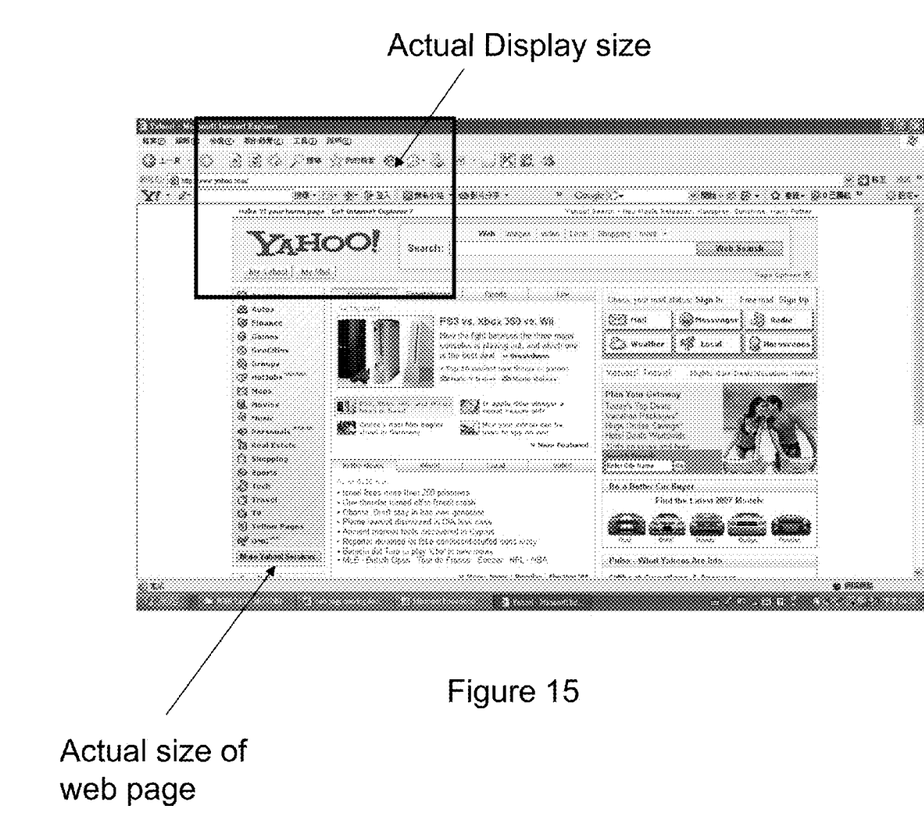
Figure 151:
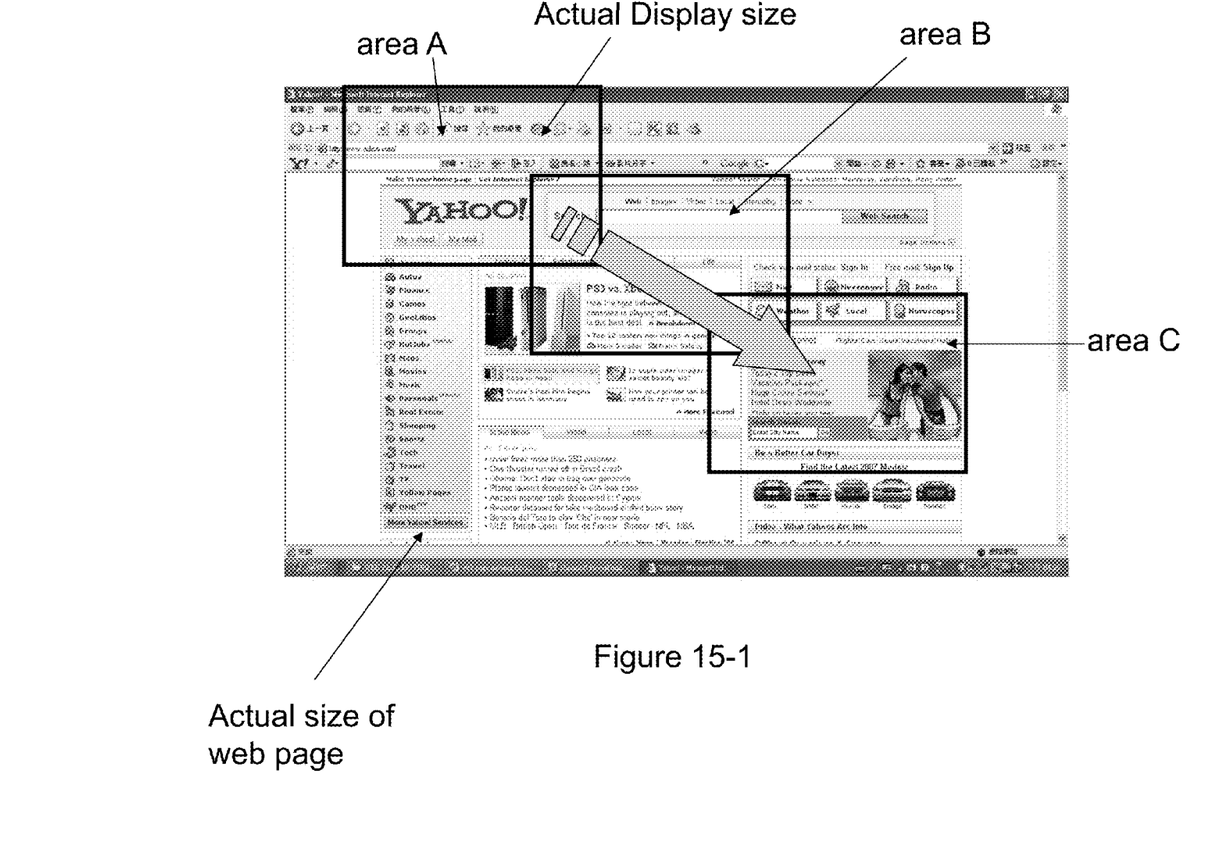
Figure 152:
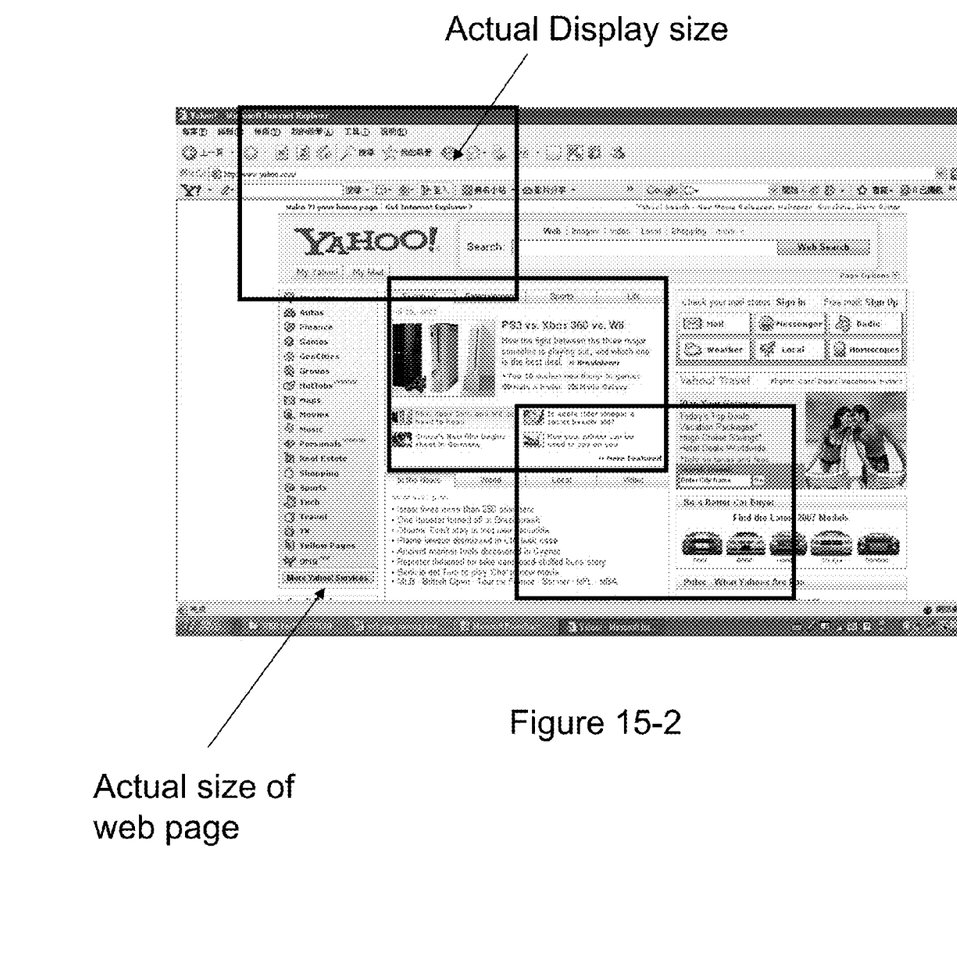

The signals generated at the sensing points may be used to determine how the user would like to move the web page displayed on the display. By way of example, each portion of the hand in contact with the device produces a contact patch area. Each of the contact patch areas covers several sensing points thus generating several signals. The signals may be grouped together to form a signal that represents how the user is moving the web page. In one embodiment, the difference between a current signal and a last hand signal may indicate the user's desire to implement a function of moving webpage. A significant difference indicates the user's desire to implement a function. Changes between contact patch areas may further indicate the particular moving signal. In mapping, the touch surface is divided into one or more button zones that represent regions of the device that when selected implement the particular button function associated with the button zone. The button zone having the contact patch area with the most significant change between first and second hand signals is the one that is typically implemented. The position and size of the button zones may also be customizable. For example, page back, page next and so on. The customization may be performed by the user and/or the device. It is because that the display is to small, the whole web page (or text, image) can not be seen and displayed by the display, as shown in FIG. 15. The display of PC may browser the almost the full page of the web information, however, it can not achieve the purpose by the portable device with small display. From FIG. 15, the user may only browser a part of the "actual web page", not full page of the web information due to the limitation of the size of the display. The other area outside the actual display window indicated in the FIG. 15 can not be viewed by the user. Conventionally, the user should click the scroll bar or keys to scroll the web page (or text, image, email) back and forth, right and left. It is very inconvenient to the user and the convention method is not user friendly design. However, the present invention provides the solution. The user may move his finger on the screen to introduce a user (or finger) movement for indicating where the user would like to view. For example, the user may move his finger and the movement is indicated by the arrow from area A to area C through area B to browse the part (area C) of the web page, as shown in FIG. 15-1. Thus, the user may move his figure on the display to review anywhere of the web page (image or text) while the display is too small, especially for the portable device, as shown in FIGS. 15-1 to 15-2.

FIG. 14 is an operational method in accordance with one embodiment of the present invention. The method 1420 generally begins at block 1422 where the device is in standby. Standby generally implies that the device is in a state of readiness waiting for something to happen, i.e., a user initiating an action therewith. Following block 1422, the process flow proceeds to block 1424 where a determination is made as to whether the user is touching the device. This is generally accomplished with touch sensing device capable of generating signals when a hand nears the device and a control system configured to monitor the activity of the touch sensing device. If it is determined that the user is not touching the device, then the process flow proceeds back to block 1422 thereby keeping the device in standby. If it is determined that the user is touching the device, then the process flow proceeds to block 1426 where the user is determined.

In one embodiment, once the second location is determined, the process flow proceeds to block, at least two sensing points signals are detected by the controller. Following block 1428 the process flow proceeds to block 1430, where touch events are monitored, control signals are generated based on the touch event. The control signals 1432 may be used to inform the application software within the device to move the web page displayed on the screen instead of by moving the web page by scroll using keys, cursor or touch pen.

The processor can be implemented on a single-chip, multiple chips or multiple electrical components. For example, various architectures can be used for the processor, including dedicated or embedded processor, single purpose processor, controller, ASIC, and so forth. In most cases, the processor together with an operating system operates to execute computer code and produce and use data. The operating system may correspond to well known operating systems such as OS/2, DOS, Unix, Linux, and Palm OS. Memory provides a place to store computer code, the memory may include Read-Only Memory (ROM), Random-Access Memory (RAM), hard disk drive, flash memory and/or the like. The display is generally configured to display a graphical user interface (GUI) that provides an easy to use interface between a user of the electronic device and the operating system or application running thereon. The electronic device also includes a touch screen that is operatively coupled to the processor. The touch screen is configured to transfer data from the outside into the device. The electronic device also includes a sensing device that is operatively coupled to the processor. The sensing device may also be used to issue web page moving commands.

Examples of hand held devices include PDAs, Cellular Phones (smart phone), Media player, Game players, Cameras, GPS receivers, notebook, tablet, digital camera, and the like. Therefore, the user may move the web page, image or document displayed on the page by directly moving the finger on the sensing array. The user may move the web-page, text, image, icon shown on the display directly by hand or user finger. Alternatively, the aforementioned embodiment may be used, independently or combination, to control or switch the TV channel, virtual object, volume and so on.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

I claim:

1. A portable phone with eye motion detection comprising:
a control unit;
a communication module coupled to said control unit;
a memory coupled to said control unit;
an antenna coupled to said communication module;
at least one eye image detection sensor coupled to said control unit, wherein said at least one eye image detection sensor includes CMOS or CCD sensor, wherein said at least one eye image detection sensor is provided to detect eye motion of said user, wherein said control unit analyzes image change of said eye motion to output a first control signal to control a first virtual object without touching said display;
a display coupled to said control unit
a microphone coupled to said control unit, and a vocal control software in said portable phone for inputting a vocal and output a second control signal through voice recognition, and controlling said portable phone without touching said display; and
a touch sensing device situated on said display to allow said user input a gesture on said display;
a neural activity sensor coupled to said control unit to detect a neural activity signal including EEG, EOG, EMG or the combination to output a third control signal to control a second virtual object without touching said display; wherein said neural activity signal is transmitted via wired or wireless to said control unit, if a predetermined signal is sensed by said neural activity sensor, said control unit being responsive to said neural activity signal to issue said second control signal to control said second virtual object on said display.

2. The portable phone of claim 1, wherein said first control signal includes cursor movement, character input, application instruction, webpage movement, bar scroll or image size change.

3. The portable phone of claim 1, wherein at least one light source is used to project light at user's pupil.

4. The portable phone of claim 1, wherein a transparent substrate of said display includes glass, quartz substrate.

5. The portable phone of claim 1, wherein said antenna includes transparent antenna formed on said display to minimize the EM shielding effect, thereby improving signal receiving/transmitting performance.

6. A portable phone with eye motion detection comprising:
a control unit;
a display coupled to said control unit; at least one eye motion detection sensor coupled to said control unit, wherein said at least one eye motion detection sensor is provided to detect eye motion of said user, wherein said control unit analyzes image change of said eye motion to output a first control signal to control a first virtual object without touching said display;
a microphone coupled to said control unit, and a vocal control software in said portable phone for inputting a vocal and output a second control signal through voice recognition, and controlling said portable phone without touching said display; and
a touch sensing device situated on said display;
a neural activity sensor coupled to said control unit to detect a neural activity signal including EEG, EOG, EMG or the combination to output a third control signal to control a second virtual object without touching said display; wherein said neural activity signal is transmitted via wired or wireless to said control unit, if a predetermined signal is sensed by said neural activity sensor, said control unit being responsive to said neural activity signal to issue said second control signal to control said second virtual object on said display.

7. The portable phone of claim 6, wherein said first control signal includes cursor movement, character input, application instruction, webpage movement, bar scroll or image size change.

8. The portable phone of claim 6, wherein at least one light source is used to project light at user's pupil.

9. The portable phone of claim 6, wherein said display comprises a transparent substrate which includes glass, quartz substrate.

10. The portable phone of claim 6, wherein said antenna includes transparent antenna formed on said display to minimize the EM shielding effect, thereby improving signal receiving/transmitting performance.

11. A portable phone with eye or finger motion detection comprising:
a control unit;
a display coupled to said control unit;
at least one eye or finger image detection sensor coupled to said control unit, wherein said at least one eye or finger image detection sensor is provided to detect eye or finger image of said user, wherein said control unit analyzes image change of said eye or finger image to output a first control signal to control a virtual object without touching said display, wherein said at least one eye or finger image detection sensor includes CMOS or CCD image sensor;
a microphone coupled to said control unit, and a vocal control software in said portable phone for inputting a vocal and output a second control signal through voice recognition, and controlling said portable phone without touching said display;
a neural activity sensor coupled to said control unit to detect a neural activity signal including EEG, EOG, EMG or the combination to output a third control signal to control said mobile phone without touching said display; wherein said neural activity signal is transmitted via wired or wireless to said control unit, if a predetermined signal is sensed by said neural activity sensor,
said control unit being responsive to said neural activity signal to issue said third control signal; and
a touch sensing device situated on said display.

12. The portable phone of claim 11, wherein said first control signal includes cursor movement, character input, application instruction, webpage movement, bar scroll or image size change.

13. The portable phone of claim 11, wherein said display includes glass, quartz substrate.

* * * * *